United States Patent [19]

Le Bihan

[11] Patent Number: 5,189,672
[45] Date of Patent: Feb. 23, 1993

[54] DEVICE FOR REGULATING THE THROUGHPUT OF VIRTUAL CIRCUITS ON AN ASYNCHRONOUS TIME-DIVISION MULTIPLEX TRANSMISSION CHANNEL

[75] Inventor: Denis Le Bihan, Lanmerin, France

[73] Assignee: Alcatel Cit, Paris, France

[21] Appl. No.: 917,748

[22] Filed: Jul. 24, 1992

Related U.S. Application Data

[63] Continuation of Ser. No. 597,939, Oct. 12, 1990, abandoned.

[30] Foreign Application Priority Data

Oct. 12, 1989 [FR] France .................... 89 13341

[51] Int. Cl.$^5$ ............................... H04J 3/24
[52] U.S. Cl. ........................ 370/94.1; 370/60
[58] Field of Search ............ 370/94.1, 60, 58.1, 370/58.2, 58.3, 112, 84, 61, 60.1, 66, 85.6, 13, 17; 340/825.5, 825.51; 379/133, 134

[56] References Cited

U.S. PATENT DOCUMENTS

| | | | |
|---|---|---|---|
| 4,603,416 | 7/1986 | Servel et al. | 370/94.1 |
| 4,630,262 | 12/1986 | Callens et al. | 370/94.1 |
| 4,922,488 | 5/1990 | Niestegge | 370/94.1 |
| 4,969,149 | 11/1990 | Killat et al. | 370/60 |
| 4,974,223 | 11/1990 | Ancheta et al. | 370/94.1 |
| 4,993,024 | 2/1991 | Quinquis et al. | 370/84 |
| 5,016,159 | 5/1991 | Maruyama | 370/94.1 |

FOREIGN PATENT DOCUMENTS 0171596 2/1986 European Pat. Off. .

OTHER PUBLICATIONS

IEEE Journal on Selected Areas in Communications, vol. SAC-5, No. 8, Oct. 1987, pp. 1315-1326, IEEE, New York, US; M. G. H. Katevenis: "Fast switching and fair control of congested flow in broad-band networks".

IBM Technical Disclosure Bulletin, vol. 18, No. 6, Nov. 1975, pp. 1787-1788, New York, US; S. W. Friedman et al.: "Queuing technique for bandwidth allocation in a packet switched network".

Primary Examiner—Douglas W. Olms
Assistant Examiner—Dang Ton
Attorney, Agent, or Firm—Sughrue, Mion, Zinn, Macpeak & Seas

[57] ABSTRACT

A device for regulating the throughput of virtual circuits carried by an asynchronous time-division multiplex transmission channel in which the incoming cells of an input asynchronous time-division multiplex channel (mtr) including a header containing a destination indicator which can be used as a virtual circuit identifier are routed to a cell memory (MT) comprising a ..., MAn), each cell being stored in the virtual circuit buffer memory associated with the virtual circuit to which the cell belongs, and the outgoing cells of an output asynchronous time-division multiplex channel (mte) are read in the same virtual circuit buffer memories (MA1, MA2, ..., MAn). Cells to be transmitted on the outgoing link are read from the buffer memories in an order such that the cells from the same virtual circuit buffer memory are spaced on average by at least an interval specifier to that virtual circuit.

10 Claims, 1 Drawing Sheet

DEVICE FOR REGULATING THE THROUGHPUT OF VIRTUAL CIRCUITS ON AN ASYNCHRONOUS TIME-DIVISION MULTIPLEX TRANSMISSION CHANNEL

BACKGROUND OF THE INVENTION

This is a continuation of application Ser. No. 07/597,939 filed Oct. 12, 1990, now abandoned.

The present invention concerns a device for regulating the throughput of virtual circuits on an asynchronous time-division multiplex transmission channel.

An asynchronous time-division multiplex transmission channel carries data messages in digital data structures called cells. Each cell has a header comprising, for example, four 8-bit characters and a message body comprising a specified number of characters (32, for example). A continuous stream of such cells is carried by the transmission channel. If there is no message to be transmitted the transmission channel carries an "empty" cell, that is to say a cell with the same format as a message cell and containing conventional, easily recognizable information. Steps are taken to maintain a sufficient proportion of such empty cells in the stream of message cells; they are used, in particular, to synchronize the receiving end to the cell format.

The header of each message cell contains (on two characters, for example) information defining for the receiving end the direction in which the message body must be forwarded. The other two characters of the header contain service information and, in particular, code control and error detection information relating to the two destination characters. The same information is contained in the headers of irregularly spaced cells which have the same destination. It therefore identifies, so to speak, a virtual circuit occupying part of the transmission capacity of the transmission channel. More generally, this virtual circuit contributes a certain throughput on the transmission channel, measured in cells per unit time, for example, and this throughput fluctuates. A specific object of the invention is to regulate the throughput as closely as possible.

The transmission channel supports at any time a multiplicity of virtual circuits whose cells are interleaved in an irregular way by what is usually called asynchronous time-division multiplexing. The different virtual circuits have different, fluctuating throughputs. The sum of these throughputs is limited by the maximum throughput of the transmission channel, and also fluctuates. This leaves room for transmitting empty cells.

Also, the number of virtual circuits that can be separately identified depends on the number of bits assigned to this information in the cell header. The maximum number of virtual circuits is determined, among other things, by the number of virtual circuits obtained by dividing the maximum throughput of the transmission channel by the minimum throughput of a data source that can utilize a virtual circuit. This number is very large, for example 64K.

However, asynchronous time-division multiplex transmission is used in a very wide field of applications and the throughputs of sources that can utilize a virtual circuit cover a vast range of throughputs (for example, from a few kilobits to several hundreds of megabits per second). The number of active virtual circuits will therefore usually be much less than the maximal number.

The above definition of asynchronous time-division multiplex transmission must not be limited to the case where all the cells are the same length. It is feasible to use cells of different lengths which are all multiples of a base length and in the context of the present invention the necessary adaptations will be evident to those skilled in the art.

An asynchronous time-division multiplex transmission channel is therefore designed to carry data supplied by sources with extremely varied and fluctuating throughputs. The forward switching and transmission equipments route the messages contained in the cells to their destination. To prevent the risk of forward congestion, it is necessary to prevent any source deliberately or accidentally contributing a throughput greater than the overall throughput assigned to it, even temporarily.

One known solution to this problem is known as "repression". The transmission channel is prevented from routing any cell regarded as being in excess of the overall throughput assigned to the virtual circuit, or at the very least the excess cell is marked as such so that it can be rejected further along the link if congestion occurs.

The present invention proposes another solution to this problem, based essentially on regulation of the throughput.

SUMMARY OF THE INVENTION

The invention consists in a device for regulating the throughput of virtual circuits carried by an asynchronous time-division multiplex transmission channel in which the incoming cells of an input asynchronous time-division multiplex channel including a header containing a destination indicator which can be used as a virtual circuit identifier are routed to a cell memory comprising a plurality of virtual circuit buffer memories, each cell being stored in the virtual circuit buffer memory associated with the virtual circuit to which the cell belongs, and the outgoing cells of an output asynchronous time-division multiplex channel are read from the same virtual circuit buffer memories. This device is characterized in that it comprises control means such that the cells to be transmitted on the outgoing link are read from the buffer memories in an order such that the cells from the same virtual circuit buffer memory are spaced on average by at least an interval specific to that virtual circuit.

Recording incoming cells in virtual circuit buffers enables the control device to choose the cells to be transmitted from these buffers so that those of the same virtual circuit comply with a specific interval which is specific to that virtual circuit, achieving the required result.

According to another characteristic of the invention, in this throughput regulation device, cell times corresponding to successive time intervals in which the outgoing cells are transmitted on the output asynchronous time-division multiplex transmission channel are numbered cyclically and a cell time queue is assigned to each of such cell times having a separate number, the transmission of consecutive cells of the same virtual circuit complying with said specific interval being achieved by writing an indicator identifying this virtual circuit into the cell time queues spaced by at least said specific interval, while in each cell time identified by its number the content of the queue of the cell time corresponding to this number is transferred into a transmit queue, each virtual circuit indicator of the transmit queue being used in turn to read in the buffer memory of the virtual circuit to which it belongs a cell which is transmitted on the output asynchronous time-division multiplex transmission channel.

Obtaining a specific interval between the cells of the same virtual circuit therefore results from the assignment of a cell to be transmitted to a cell time which follows by this interval that to which the previous cell was assigned; this assignment entails writing the virtual circuit into a queue associated with the required cell time, the queues of successive cell times being finally strung together in a single transmit queue. These arrangements make it possible to resolve possible conflicts of requests to transmit cells in the same future cell time.

According to another characteristic of the invention, when an outgoing cell is transmitted and if the buffer memory of the virtual circuit to which it belongs contains at least one other cell, the indicator identifying this virtual circuit is written into a cell time queue which is selected on the basis of the current cell time or the cell time to which the transmitted outgoing cell whose identifier was stored for this purpose was assigned, allowing for a speed indicator attached to the virtual circuit to which said outgoing cell belongs.

According to another characteristic of the invention, when an outgoing cell is transmitted and if the buffer memory of the virtual circuit to which it belongs contains at least one other cell, the indicator identifying this virtual circuit is written into a cell time queue which is selected on the basis of the current cell time or the cell time to which the transmitted outgoing cell, the identifier of which was stored for this purpose, was previously assigned, allowing for a speed indicator attached to the virtual circuit to which said outgoing cell belongs and data depending on the observed throughput of this virtual circuit.

According to another characteristic of the invention, when an incoming cell is received and if the buffer memory of the virtual circuit to which this incoming cell, belongs does not contain any other cell the indicator identifying this virtual circuit is written into a cell time queue which is determined according to the current cell time.

According to another characteristic of the invention, when an incoming cell is received and if the buffer memory of the virtual circuit to which this incoming cell, belongs does not contain any other cell the indicator identifying this virtual circuit is written into a cell time queue which is determined on the basis of the current cell time and a speed indication attached to the virtual circuit in question.

According to another characteristic of the invention, said throughput dependent data is a measure of the occupancy of the buffer memory of the virtual circuit of the cell in question.

According to another characteristic of the invention, for a degree of filling at least of the buffer memory of a virtual circuit there is provided a count indicator which is incremented when each cell belonging to this virtual circuit is transmitted if said degree of occupancy is exceeded and decremented if it is not reached, said count indicator having a maximal value reached if said degree of occupancy is exceeded on a majority basis which then causes the use of a speed indicator associated with a larger spacing of the cells of this virtual circuit at the output of the throughput regulator device.

BRIEF DESCRIPTION OF THE DRAWINGS

The various objects and characteristics of the invention will emerge in more detail from the following description given by way of non-limiting example with reference to the appended diagrammatic drawings, in which.

DETAILED DESCRIPTION OF THE INVENTION

Figure 1:
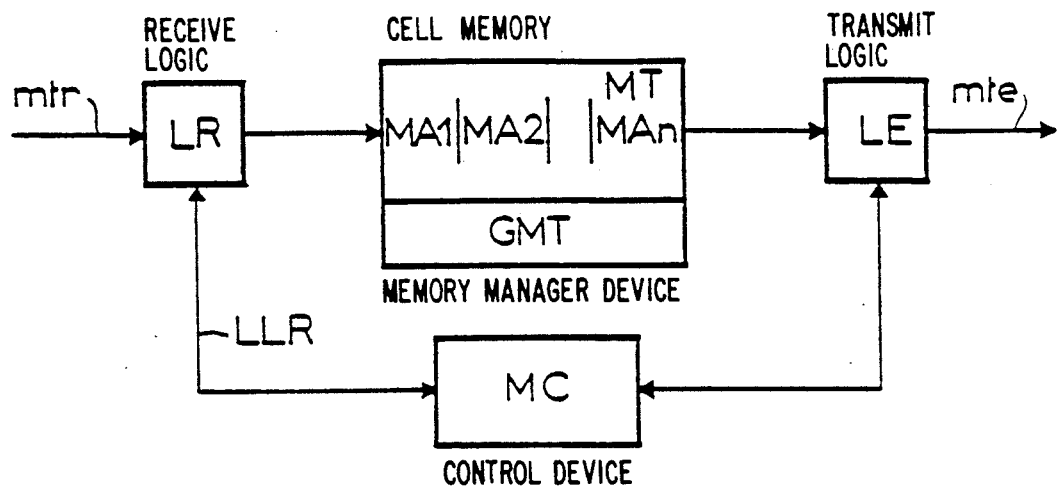
FIG. 1 is a block diagram of one embodiment of the throughput regulation device in accordance with the present invention.

There will be first be described with reference to FIG. 1 the general block diagram of one embodiment of the present invention.

An input asynchronous time-division multiplex channel mtr is connected to receive logic LR. This multiplex channel is of the type mentioned in the preamble, for example. It supplies successive incoming cells including a header containing a virtual circuit number.

An output asynchronous time-division multiplex channel mte is connected to transmit logic LE. This channel is of the same type as the input channel mtr. The transmit logic LE supplies it with successive outgoing cells which normally comprise all the incoming cells.

The receive logic LR is connected to a cell memory MT which includes for each virtual circuit a respective buffer MA1, MA2, ..., MAn. A memory manager device GMT is associated with the cell memory MT. In the cell memory MT the memory manager device GMT assigns to each active virtual circuit on the channels mtr, mte a buffer of sufficient size for the requirements that will be become clear later. Everything then proceeds as if each possible virtual circuit has its own buffer in the cell memory MT. Such arrangements are known in themselves.

The principal function of the receive logic LR is to place in the respective buffers the incoming cells received from the input channel mtr. To this end it determines the virtual circuit number included in an incoming cell, identifies the buffer assigned to it (in conjunction with the memory manager device GMT), and determines the address in the buffer of this virtual circuit at which the incoming cell must be stored.

The transmit logic LE reads the cells to be sent from the queues MA1, MA2, ..., MAn in the memory MT. Its principal function is to determine the order in which the received cells stored in the buffer must be retransmitted so that the cells belonging to the same virtual circuit are appropriately spaced on the output channel mte.

The incoming channel mtr, which is of the type mentioned in the preamble, supplies a stream of cells which are temporarily stored in the cell memory MT before they are retransmitted on the outgoing channel mte. The overall incoming throughput and the overall outgoing throughput are the same. When the spaces between the cells of the virtual circuits are satisfactory the cells received in a particular order on the incoming channel mtr and stored in the cell memory MT are retransmitted in the same order on the outgoing channel mte and the device described has virtually nothing to do.

However, as explained in the preamble, it sometimes happens that the incoming cells do not comply with the required spacing. The device in accordance with the invention therefore comprises means in the receive logic LR, in the transmit logic LE and in a control device MC to impose compliance with a certain spacing between the cells of each of the virtual circuits on the outgoing channel mte.

This is readily achieved by using a control device MC having a transmit queue of the FIFO (first in - first out) type in which the receive logic LR writes the storage addresses of the incoming cells, one after the other, and from which the transmit logic LE reads the successive storage addresses of the cells to be transmitted. Things can be arranged so that transmission follows reception with a delay of a certain number of cells. Provided that the spacing of the incoming cells is satisfactory, the incoming cells are retransmitted in the order of arrival. If the spacing of cells of the same virtual circuit drops below a particular value, the entry of the storage addresses into the transmit queue is delayed in order to impose the required spacing.

Figure 2:
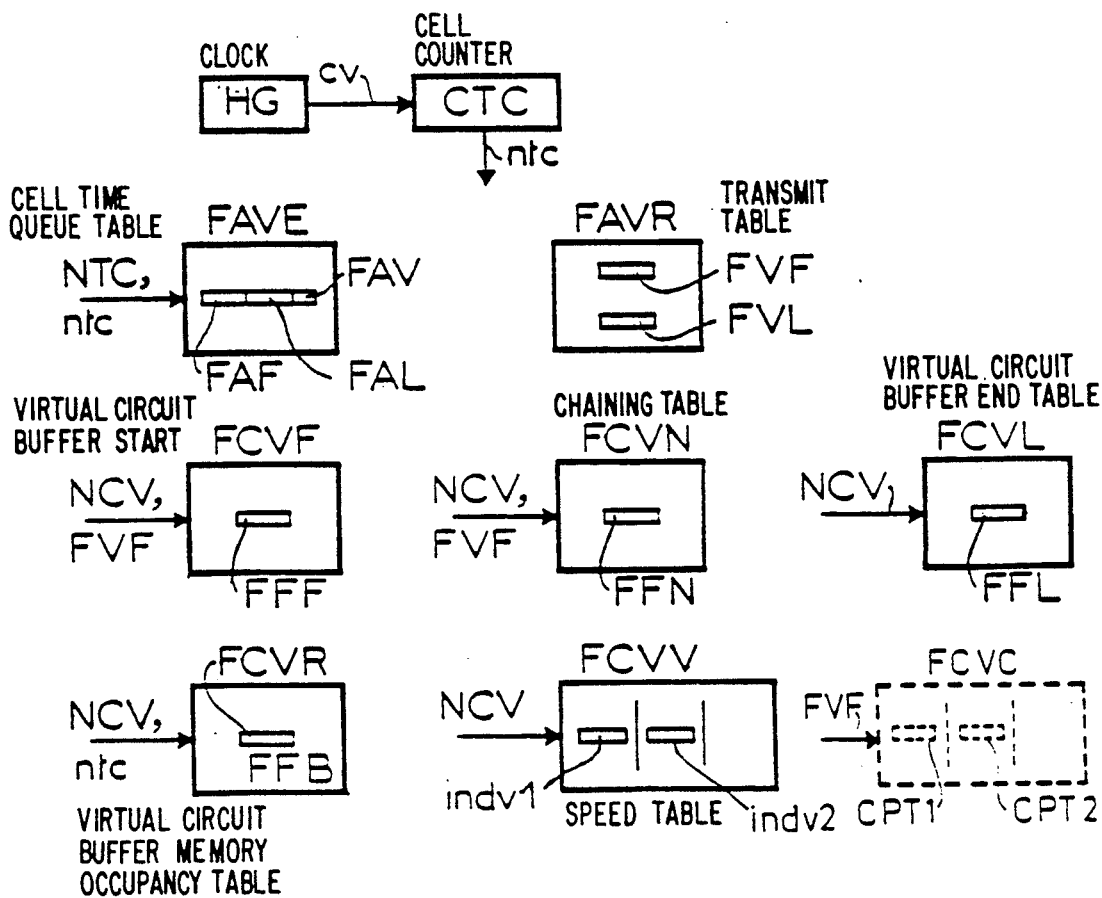
FIG. 2 shows one embodiment of the control device from FIG. 1.

FIG. 2 shows one embodiment of the control device MC in accordance with the invention. It essentially comprises a clock HG, a cell counter CTC and memory areas.

The clock HG is synchronized to the signals received on the incoming multiplex channel mtr and provides signals including a signal CV which identifies the start of a repetitive time interval referred to as the cell time whose duration is the time to receive or transmit one cell.

The cell time counter CTC is a cyclic counter with N states (where N is an integer and preferably equal to a power of 2) which supplies, in each cell time, a cell time number which takes the values from 0 through $N-1$ in succession.

The control device MC in FIG. 2 receives from the receive logic LR the identifier NCV of the virtual circuit to which the received cell belongs.

The memory areas of the control device MC comprise:

a cell time queue table FAVE with N entries, one for each cell time number, containing the identifier FAF of a first virtual circuit having a cell to transmit, the identifier FAL of a last virtual circuit having a cell to transmit, and a bit FAV used to mark an empty queue, a transmit table FAVR containing the identifier FVF of a first virtual circuit having a cell to be transmitted and the identifier FVL of a last virtual circuit having a cell to be transmitted, a virtual circuit buffer start table FCVF having one entry per virtual circuit, each containing the address FFF of one location in the buffer memory of this virtual circuit at which is stored a first cell of this virtual circuit to be transmitted, a virtual circuit buffer end table FCVL having one entry per virtual circuit, each containing the address FFL of one location of the buffer memory of this virtual circuit at which is stored a last cell of this virtual circuit to be transmitted, a virtual circuit buffer memory occupancy table FCVR having one memory location per virtual circuit, each containing a count FFB of the number of cells of this virtual circuit stored in the buffer memory of this virtual circuit, a speed table FCVV having one memory location per virtual circuit, each containing at least two speed indicators indv1 and indv2 to be used in relation to this virtual circuit as will be explained later, and a chaining table FCVN having one memory location per virtual circuit, each containing the identifier FFN of another virtual circuit to which the virtual circuit in question is chained.

When a cell is received on the incoming channel mtr, in conjunction with the memory manager device GMT the receive logic LR addresses itself to the control device MC through an interface LLR, supplying information including the identifier NCV of the virtual circuit to which the cell belongs, obtained from the header of the cell. The control device MC responds by reading the table FCVL and obtains the address FFL in the cell memory MT (in the buffer memory assigned to the virtual circuit by the memory manager device GMT) of the memory location at which the last cell of this virtual circuit received is stored. After incrementation (modulo the extension of the virtual circuit buffer memory, with the assistance of the memory manager device GMT, consulted over the link LLG), this supplies the address at which the incoming cell must be stored in the cell memory MT. The incremented address FFL+1 is stored in the table FCVL in the location that has just been read.

The control device reads the table FCVR according to the virtual circuit identifier NCV and obtains the number FFB of cells of the virtual circuit already stored in the cell memory MT. This number is also incremented and then rewritten to the same location.

The number FFB is also tested, for example before it is incremented. If it is not equal to zero, no specific action is necessary. The receive logic LR merely stores the incoming cell in the cell memory MT at the address FFL+1, as previously explained. If the number FFB is equal to zero, the cell stored in the buffer memory of the virtual circuit is therefore not only the last but also the first cell. The virtual circuit buffer start table FCVF is therefore read at the address NCV, just like the table FCVL, and the address FFL+1 is written into it as the new address FFF.

If the number FFB is equal to zero, the received cell must be assigned to a cell time so that it can be retransmitted. To this end the control device MC writes the virtual circuit identifier NCV into the queue table FAVE. The control device MC addresses the table FAVE with an address indicator NTC derived from the current cell time number, supplied by the counter CTC, for example by adding at least one unit. At the location in the table FAVE designated by the address indicator NTC the control device MC reads the identifier FAF of the first virtual circuit associated with this specific cell time which has a cell to transmit, that FAL of the last virtual circuit associated with this specific cell time which has a cell to transmit and the bit FAV. The control device MC stores as the new identifier FAL the number NCV of the virtual circuit in question. The identifier FAL is also used to address the table FCVN and to write into it the identifier NCV as a chaining indicator FFN. However, if the bit FAV indicates that the queue is empty this latter operation is omitted and the identifier NCV is written as the identifier FAF into the table FAVE at the address NTC. The bit FAV is complemented to indicate that the queue is no longer empty.

The number of the virtual circuit in question is therefore chained in a queue associated with the next cell time, the start of which is the identifier FAF and the end of which is the identifier FAL, this chaining being materially represented by the writing of virtual circuit numbers into the table FCVN; this method is conventional.

As an alternative, instead of chaining the virtual circuit number in the next cell time, the table FCVV is also read and supplies from a location belonging to the virtual circuit concerned, read in response to the virtual circuit number NCV, a speed indicator indv1 which is added to the current cell time number ntc. The sum ntc+indv1 then provides the address NTC. The speed indicator indv1, which can be a value of the cell spacing to be applied when the virtual circuit buffer memory is virtually empty, is then used to hold in the buffer memory a first cell received from the virtual circuit, in order to cause the spacing process to be applied, as will be explained later.

In parallel with this, as in the previous case, the received cell is stored in a location of the cell memory MT at the address FFL+1.

All the cells received are stored in this way. A first cell of a virtual circuit which arrives when the buffer memory of this virtual circuit is empty is chained in the manner that has just been explained. Subsequent cells, which arrive when the buffer memory is no longer empty, are not chained in this way; they are chained later and differently, as will now be explained in the description of the transmission process.

When a cell must be transmitted on the outgoing channel mte the transmit logic LE addresses itself to the control device MC..

Using the number ntc supplied by the counter CTC, the control device MC reads the table FAVR. The indicator FVF designates a virtual circuit whose buffer memory contains a cell to be transmitted. To access it the indicator FVF is used to address the buffer start table FCVF which supplies an indicator FFF which is the address of the memory location in the buffer memory assigned to this virtual circuit containing the cell to be transmitted. This address is supplied to the transmit logic LE over the link LLE and is used to read and to transmit the cell. The table FCVR is also read and the indicator FFB is decremented; it can by this process be reduced to zero and instigate the chaining of the virtual circuit by the tables FAVE and FCVN on the arrival of a subsequent cell, as previously described. Also, the address FFF is incremented (modulo the extension of the virtual circuit buffer memory, using the memory manager device GMT consulted over the link LLG), which supplies an indicator FFF+1 which is stored in the buffer start table FCVF as the new indicator FFF.

The same indicator FVF is used to address the chaining table FCVN. This table supplies at the address indicated the identifier of a subsequent virtual circuit FFN in the transmit queue which is then written into the table FAVR as the new indicator FVF, for the purpose of transmitting the next cell. The combination of the tables FAVR and FCVN supplies a list of the virtual circuits to supply cells to be transmitted, in the requisite order. If it is empty, simple means enable the transmission of empty cells. These need not be described further.

The control device MC addresses the queue table FAVE using the number ntc to read the identifier FAF at the start of the queue of virtual circuits associated with the cell time in question and the identifier FAL at its end, unless the bit FAV indicates that the queue is empty. The identifier FVL obtained from the table FAVR is used to address the table FCVN. The identifier FAF is written at the address in question of the table FCVN and the identifier FAL is written into the table FAVR as the new indicator FVL. The bit FAV is complemented in the location just read of the table FAVE to indicate that the queue is empty. This achieves the chaining of all of the queue associated with the cell time in question into the queue of virtual circuits with cells to transmit. Note that this chaining can instead be done before processing the transmit queue in order to transmit an outgoing cell.

Of course, if the bit FAV initially read in the table FAVE indicates that the cell time queue in question is empty the operations of chaining into the transmit queue as just described are omitted.

As a cell of a virtual circuit has just been put into transmission, it remains to initialize the transmission of any subsequent cell of the same virtual circuit. Using the identifier FVF of this virtual circuit obtained from the table FAVR, the buffer occupancy table FCVR and the speed table FCVV are read. The former indicates the number of cells waiting in the virtual circuit buffer memory. The higher this number, the higher the speed of transmission of the cells of the virtual circuit, that is to say the shorter the time interval between them. To give an example, the table FCVV supplies two indicators indv1 and indv2, each associated with one level of occupancy of the virtual circuit buffer memory. These indicators may be the number of cell times which must elapse before the next cell of the virtual circuit is transmitted. If the occupancy is low (FFB below a set threshold equal, for example, to half the capacity of a buffer memory), then the indicator indv1 is applied. The control device MC calculates the sum ntc+indv1 and uses it to address the table FAVE. The identifier FAL of the last virtual circuit associated with this cell time is used to address the table FCVN and to write into it at this address the identifier FAF of the virtual circuit concerned, read from the table FAVE at the address ntc. This latter identifier is then written into the table FAVE at the address ntc+indv1, as the new address FAL. The bit FAV at the same address is complemented, if necessary, to indicate that the queue is not empty. These operations chain the virtual circuit to the cell time ntc+indv1. Of course, if the occupancy of the virtual circuit buffer memory is not high the indicator indv2 may be applied and cause chaining of this virtual circuit, associating it with a nearer cell time ntc+indv2, and so on. The intervals between cells specified by the indicators indv1, indv2, etc will allow for the transmission speed of the virtual circuit. Note that this interval is at most equal to N, which is not a problem, even for low-throughput virtual circuits.

An additional feature of the regulator device in accordance with the invention, as just described, is shown in dashed outline in FIG. 2. It is a table FCVC having one location per virtual circuit containing at least one count indicator CPT1, CPT2, etc. This memory is addressed when a cell is transmitted using the indicator FVF supplied by the transmit queue (table FAVR). The count indicator CPT1 is decremented or incremented according to the number of cells waiting in the virtual circuit buffer memory, as indicated by the indicator FFB from the table FCVR. The counter CPT1 is decremented (down to zero only) if the occupancy of the buffer memory is low and leads, for example, to use of the spacing indicator indv1. It is incremented if the occupancy is higher. Other similar count indicators like CPT2 can be associated with higher occupancy limits. Each additional count indicator will have a reduced capacity relative to its predecessors. These various count indicators will therefore each represent an average presence of the throughput of the incoming circuit at a given level, the set of these count indicators defining a throughput-time limiting curve. If the virtual circuit throughput remains too long at a given level, the corresponding count indicator will reach its maximum value. It is then a simple matter to apply a mandatory limit to the time for which the throughput can, on average, remain at any given level by defining the count capacity of the corresponding count indicator and by arranging things so that, if the count indicator of this level reaches its maximum value, instead of applying the spacing indicator which applies normally for this level (indv2, for example), a spacing indicator is chosen instead which results in a lower output throughput (indv1, for example). This will result in a rapid increase in the occupancy of the buffer memory if the input throughput is not reduced and, as a consequence of this, subsequent refusal of supernumerary cells.

To summarize, each incoming cell i stored in the buffer memory of the virtual circuit to which it belongs. The outgoing cells are transmitted in cell times which are numbered cyclically. A cell time queue is associated with each cell time. A transmit queue is associated with the outgoing channel. It is supplied by the cell time queues.

A first incoming cell of a given virtual circuit firstly causes the virtual circuit to be written into the queue of a cell time after that in which it arrives. When this cell time is reached, the corresponding cell time queue is added to the end of the transmit queue. When its turn comes in the transmit queue, the virtual circuit supplies the cell in question which is transmitted as an outgoing cell.

If the virtual circuit throughputs are low, each cell is retransmitted before a subsequent cell arrives, with the result that all the cells are processed as just explained and the incoming cells are retransmitted in the order in which they arrive.

Immediately a cell arrives before the previous cell has been retransmitted, this second cell is simply stored in buffer memory. When the first cell is retransmitted the presence of a second cell causes the virtual circuit to be written into a queue of a particular future cell time on the basis of a speed indicator specific to the virtual circuit. The second cell will therefore be retransmitted with a particular minimal spacing relative to the first. The same will apply to subsequent cells, if necessary, until the processing originally described is reverted to. By imposing a minimum spacing the system described regulates the throughput of the virtual circuit, eliminating throughput peaks. Note that it would be a simple matter to impart to the transmitted cells a particular mean spacing rather than a minimal spacing. It is sufficient to determine the cell time with which a virtual circuit is associated for the transmission of a subsequent cell, at the time of transmitting the current cell, not from an expression such as $ntc + indv1$ or $ntc + indv2$, as explained above, in which ntc designates the current cell time, but using an expression such as $NTC(i+1) = NTCi + indv1$ or $NTCi + indv2$, in which NTCi is the cell time with which the current cell was previously associated. To this end it is sufficient to hold the information NTCi in an additional table similar to the table FCVF and to read it when calculating $NTC(i+1)$. In this way the consecutive cells of the same virtual circuit will be assigned to cell times regularly spaced by indv1 or indv2 and therefore transmitted with a real spacing based on average on a regular spacing and affected only by irregularities of the cell time queues. Of course, the above expression for $NTC(i+1)$ is applicable only if it supplies a value designating a cell time after the current cell time ntc. For this reason means may be provided for correcting the value $NTC(i+1)$ so that this is so in all cases.

Note, incidentally, that the buffer memory of a virtual circuit can be large enough so that it is virtually never full, in particular through using a dynamic memory manager device GMT. It is also possible to make provision so that once this state is reached any supernumerary cell is simply ignored. This can be achieved in a simple way, for example, by detecting that the indicator FFL+1 is equal to the indicator FFF and by then prohibiting the writing operation which would otherwise cause overwriting of data in the corresponding virtual circuit buffer memory.

The determination of the cell time to which the second cell mentioned above belongs will also allow for the throughput of the virtual circuit expressed, for example, in terms of the occupancy of the virtual circuit buffer memory. If this occupancy is stable, this amounts to allowing for the incoming throughput, and the increase in the incoming throughput is reflected in a limited increase in the outgoing throughput. This system tends therefore to maintain the regulation of the throughput even in the presence of strong throughput peaks. Choosing the occupancy of the buffer memory as a measurement of the throughput is merely a convenience. The throughput can be measured in many other ways.

The receive logic LR, the transmit logic LE, the memory manager device GMT and the control device MC are essentially logic type data processing devices. There is no need to describe them in detail. In the current state of the art their implementation will be evident to those skilled in the art; it will be based on the use of programmed processors offering performance matched to the available times for carrying out the stated operations, allowing for the throughput of the multiplex links. According to requirements in terms of performance, a greater or lesser number of processors may be provided, sharing the described operations between them. Also, a device of this kind is feasible operating to the benefit of multiple incoming channels and multiple output channels. Consideration may even be given to associating it with or incorporating it in an asynchronous time-division multiplex channel switch.

Similarly, no mention has been made of the initialization operations which are obviously necessary and whose implementation is part of the prior art in this field.

Generally speaking, it is obvious that the foregoing description have been given by way of nonlimiting example only and that numerous variations thereon are feasible without departing from the scope of the invention.

I claim:

1. A device for regulating the throughput of virtual circuits carried by an asynchronous time-division multiplex channel in which incoming cells of an input asynchronous time-division multiplex channel, each belonging to one of said virtual circuits and including a header containing a destination indicator which can be used as a virtual circuit identifier, are routed to a cell memory comprising a plurality of virtual circuit buffer memories with each buffer memory associated with a respective one of said virtual circuits, each of said incoming cells being stored in the virtual circuit buffer memory associated with the virtual circuit to which the cell belongs, and all of said stored incoming cells being read from said virtual circuit buffer memories as outgoing cells of an output asynchronous time-division multiplex channel, characterized in that said device comprises control means for reading all of the stored cells from the buffer memories in an order such that cells belonging to a given virtual circuit and read from a given virtual circuit buffer memory are spaced on average by at least a given interval associated with said given virtual circuit.

2. A device according to claim 1 characterized in that cell times corresponding to successive time intervals in which the outgoing cells are transmitted on the output asynchronous time-division multiplex transmission channel are numbered cyclically and a cell time queue is assigned to each of such cell times having a separate number, the transmission of consecutive cells of a particular virtual circuit complying with a particular time interval associated with said particular virtual circuit being achieved by writing an indicator identifying said particular virtual circuit into the cell time queues spaced by at least said particular interval, while in each cell time identified by its number the content of the queue of the cell time corresponding to this number is transferred into a transmit queue, each virtual circuit indicator of the transmit queue being used in turn to read from the buffer memory of the virtual circuit to which it belongs a cell which is transmitted on the output asynchronous time-division multiplex transmission channel.

3. A device according to claim 2 characterized in that when an outgoing cell is transmitted and if the buffer memory of the particular virtual circuit to which said outgoing cell belongs contains at least one other cell the indicator identifying this virtual circuit is written into a cell time queue which is selected on the basis of a speed indicator attached to the virtual circuit to which said outgoing cell belongs so that said particular interval is obtained.

4. A device according to claim 3 characterized in that when an outgoing cell is transmitted and if the buffer memory of the particular virtual circuit to which it belongs contains at least one other cell, the indicator identifying this particular virtual circuit is written into a cell time queue which is selected on the basis of a speed indicator attached to the particular virtual circuit to which said outgoing cell belongs and data depending on an observed throughput of this particular virtual circuit.

5. A device according to claim 3 characterized in that when an incoming cell is received and if the buffer memory of the particular virtual circuit to which this incoming cell belongs does not contain any other cell, the indicator identifying this particular virtual circuit is written into a cell time queue which is determined according to a current cell time.

6. A device according to claim 3 characterized in that when an incoming cell is received and if the buffer memory of the particular virtual circuit to which this incoming cell belongs does not contain any other cell, the indicator identifying this particular virtual circuit is written into a cell time queue which is determined on the basis of a current cell time and a speed indication attached to the virtual circuit.

7. A device according to claim 4 characterized in that said throughput depending data is a measure of the occupancy of the buffer memory of the particular virtual circuit of said outgoing cell.

8. A device according to claim 7 characterized in that for a degree of filling at least of the buffer memory of said particular virtual circuit there is provided a count indicator which is incremented when each cell belonging to this particular virtual circuit is transmitted if said degree of occupancy is exceeded and decremented if it is not reached, said count indicator having a maximal value reached if said degree of occupancy is exceeded on a majority basis which then causes the use of a speed indicator associated with a larger spacing of the cells of this particular virtual circuit at the output of the device.

9. A device according to claim 3 characterized in that when a outgoing cell is transmitted and if the buffer memory of the particular virtual circuit to which it belongs contains at least one other cell, the indicator identifying this particular virtual circuit is written into a cell time queue which is selected on the basis of a current cell time.

10. A device according to claim 3 characterized in that when an outgoing cell is transmitted and if the buffer memory of the particular virtual circuit to which it belongs contains one other cell, the indicator identifying this particular virtual circuit is written into a cell time queue which is selected on the basis of the cell time to which the transmitted outgoing cell was previously assigned, whose identity has been stored for this purpose.

* * * * *